US009645600B2

(12) United States Patent
Willemsen et al.

(10) Patent No.: US 9,645,600 B2
(45) Date of Patent: May 9, 2017

(54) TWO PIECE PEDAL ARM (71) Applicant: KSR IP Holdings LLC., Wilmington, DE (US)

(72) Inventors: Larry Willemsen, Morpeth (CA); Daniel Leem, Chatham (CA)

(73) Assignee: KSR IP Holdings LLC., Wilmington, DE (US)

( * ) Notice: Subject to any disclaimer, the term of this patent is extended or adjusted under 35 U.S.C. 154(b) by 0 days.

(21) Appl. No.: 14/834,122

(22) Filed: Aug. 24, 2015

(65) Prior Publication Data
US 2016/0054752 A1 Feb. 25, 2016

Related U.S. Application Data (60) Provisional application No. 62/040,467, filed on Aug. 22, 2014.

(51) Int. Cl.
*G05G 1/30* (2008.04)
*B60T 7/06* (2006.01)
*G05G 1/44* (2008.04)

(52) U.S. Cl.
CPC . *G05G 1/44* (2013.01); *B60T 7/06* (2013.01)

(58) Field of Classification Search
CPC G05G 1/44; G05G 1/445; G05G 1/50; G05G 1/36; G05G 1/40; B60T 7/06; Y10T 74/20528
See application file for complete search history.

(56) References Cited

U.S. PATENT DOCUMENTS

| | | | | |
|---|---|---|---|---|
| 5,996,439 A | * | 12/1999 | Elton | B60T 7/065 180/255 |
| 6,019,015 A | * | 2/2000 | Elton | G05G 1/405 74/512 |
| 6,151,986 A | * | 11/2000 | Willemsen | G05G 1/405 180/320 |
| 7,409,889 B2 | * | 8/2008 | Hurwic | B60T 11/18 74/560 |
| 8,567,283 B2 | * | 10/2013 | Himetani | B60T 7/06 74/512 |
| 8,931,367 B2 | * | 1/2015 | Himetani | G05G 1/46 74/512 |
| 8,978,512 B2 | * | 3/2015 | Himetani | B60T 7/06 219/137 R |
| 9,261,895 B2 | * | 2/2016 | Tsuguma | G05G 1/44 |
| 2012/0117961 A1 | * | 5/2012 | Sellinger | B60T 7/042 60/545 |

(Continued)

FOREIGN PATENT DOCUMENTS

CZ DE 202013102141 U1 * 6/2013 ............... B60T 7/06
JP WO 2013125071 A1 * 8/2013 ............... G05G 1/44

*Primary Examiner* — Adam D Rogers
(74) *Attorney, Agent, or Firm* — Dinsmore & Shohl LLP; Douglas Mcevoy (57) ABSTRACT

A two piece pedal arm assembly which forms a shell forming an internal cavity is provided. The two shell piece pedal arm permits the ability to carefully control wall thicknesses. This permits the ability to provide the proper strength where needed in complex designs resulting in weight savings. Additionally, other components such as the bracket and cage for a ball and booster arm, pedal adjusters, and the like can be mounted within the shell thereby providing robust attachment and a more pleasing appearance.

15 Claims, 7 Drawing Sheets

(56) References Cited

U.S. PATENT DOCUMENTS

2014/0060239 A1 3/2014 Hemmege Venkatappa et al.
2014/0123801 A1* 5/2014 Kawahara ............... G05G 1/44
74/512

* cited by examiner

TWO PIECE PEDAL ARM

CROSS-REFERENCE TO RELATED APPLICATIONS

This Application claims the benefit of U.S. Provisional Application 62/040,467 filed on Aug. 22, 2014, the contents of which are incorporated in its entirety.

FIELD OF THE INVENTION

The present invention relates generally to pedal assemblies. More particularly, the present invention relates to a two piece pedal arm assembly.

BACKGROUND OF THE INVENTION

Pedal arms are used to control the operation of clutches, accelerators, and brakes in vehicles. Typical pedal arms are formed of a single bar of rigid material such as steel. Pedal arms are bent into shape to present the pedal to the user in the right position. Because of space and packaging requirements, it is frequently necessary to form complex shapes. Pedal arms are connected to control devices such as brake rods and accelerator cables. For brake rods typically a bracket holding a cage for holding the ball end of a brake booster is clipped or welded to the upper side of the upper portion of the arm. However, such assemblies are prone to failure due to the torque which is applied to the bracket and cage.

SUMMARY OF THE INVENTION

A two piece pedal arm assembly which forms a "shell" forming an internal cavity is provided. The two piece pedal arm permits the ability to carefully control wall thicknesses, specifically the wall thickness profile of two shell (depth/height) where each of the arm components has a different wall thickness. This permits the ability to provide the proper strength by optimizing section properties throughout the two piece pedal arms where needed in complex designs resulting in weight savings. Additionally, other components such as the bracket and cage for a ball and booster arm, pedal adjusters, and the like can be mounted within the shell thereby providing robust attachment, eliminating critical failure mode and a more pleasing appearance.

Generally provided is a pedal assembly including a pedal arm having a first shell piece and a second shell piece, the first shell piece and the second shell piece each having an inner longitudinal edge. In one embodiment, first shell piece and the second shell piece connected together at the longitudinal edges to form an inner cavity therebetweeen.

In some embodiments, each of the first shell piece and the second shell piece each have a generally C-shaped cross section. The free ends of the generally C-shaped cross section connect together in the assembled position. The pedal assembly further includes a pivot pin, the pedal arm adapted to pivot about the pivot pin.

A striker bracket may be provided adapted to rotate about the pivot pin. A bushing is connected to the pivot pin and the striker, the bushing having a ramped portion in communication with a housing, the ramped portion of the bushing allowing for movement of the bushing away from the housing and away from the pivot pin upon rotation of the striker and the bushing. The bushing and the striker rotate together.

Furthermore, an adjustment assembly is connected to the pedal arm. The adjustment assembly includes an actuator and a screw rod to adjust the height of the pedal arm.

In other embodiments, the pedal assembly only includes a pedal arm having a first shell piece and a second shell piece, the first shell piece and the second shell piece connected together to form an inner cavity therebetweeen. The first shell piece and the second shell piece may be divided longitudinally or otherwise.

DESCRIPTION OF THE INVENTION

Disclosed herein are various embodiments of a two piece pedal arm assembly which forms a "shell" forming an internal cavity.

The two piece pedal arm permits the ability to carefully control wall thicknesses, specifically the wall thickness profile of two shell (depth/height) where each of the arm components has a different wall thickness. This permits the ability to provide the proper strength by optimizing section properties throughout the two piece pedal arms where needed in complex designs resulting in weight savings. Additionally, other components such as the bracket and cage for a ball and booster arm, pedal adjusters, and the like can be mounted within the shell thereby providing robust attachment, eliminating critical failure mode and a more pleasing appearance.

As shown in FIGS. 1-4, a first embodiment of the invention is a shell pedal assembly 100 for a braking system. The two pieces are a left hand side shell piece 102 and a right hand side shell piece 104 which are welded together to form a cavity 106 therebetween. The shell pieces 102, 104 are typically made of metal, but can be made of a plastic, polymer, or plastic like material and ultrasonically welded together. Directions such as forward, rearward, left hand, and right hand will be used in reference to the manner in which a pedal arm will be positioned in a vehicle. Each of the side shell pieces has a central portion 108, 110 extending between an upper end and a lower end. Each of the two shell pieces 102, 104 has a generally C-shaped cross section with a side portion 112, 114 extending between a front portion and a rear portion. The edges of the front portions and the edges of the rear portions are welded together (as illustrated at reference number 116). Each upper end of the pieces has apertures 118, 120 for receiving bushings 22 to pivotally support a pivot rod 124. A sleeve 126 is mounted within the cavity to extend between the apertures 118, 120 and the bushings 122. The sleeve 126 is adapted to hold tongues 154, 165.

Figure 2:
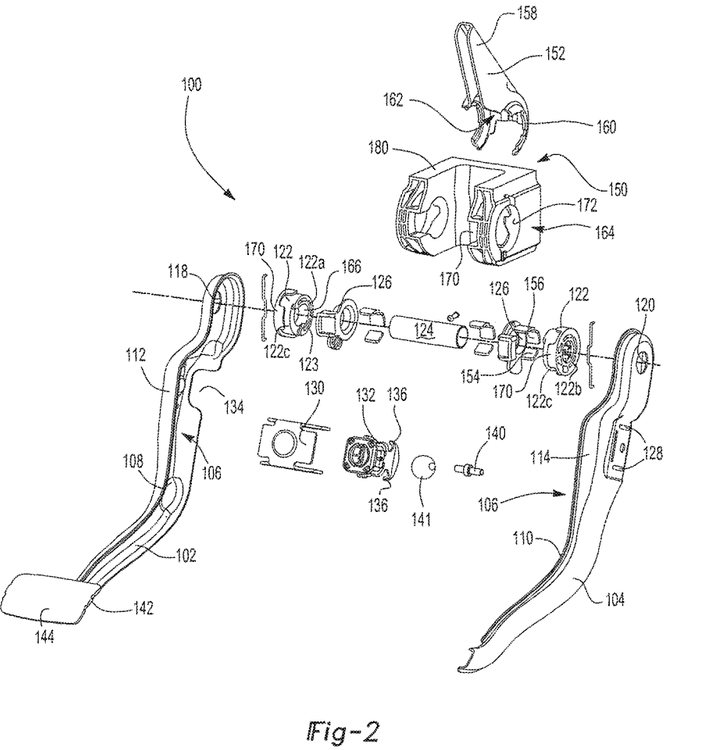
FIG. 2 illustrates a perspective exploded view of the embodiment of the pedal arm of FIG. 1.
Figure 3:
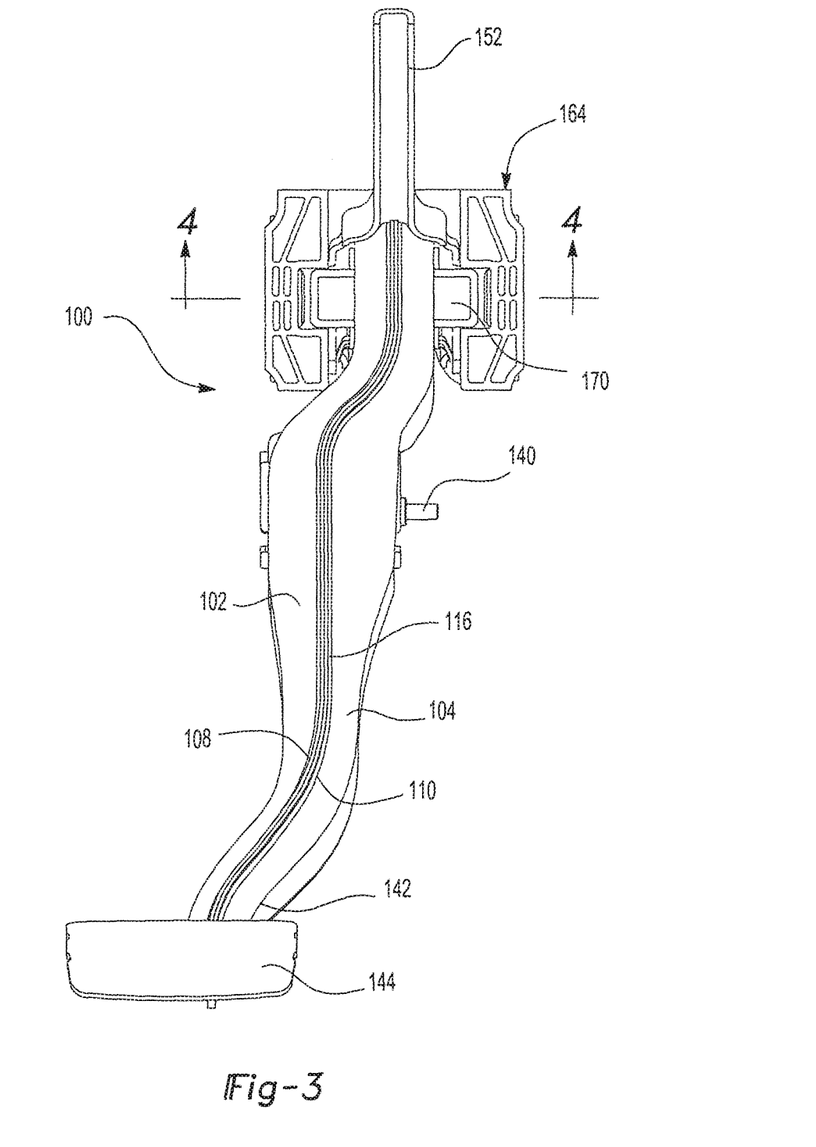
FIG. 3 illustrates a frontal view of the embodiment of the pedal arm of FIGS. 1 and 2.
Figure 4:
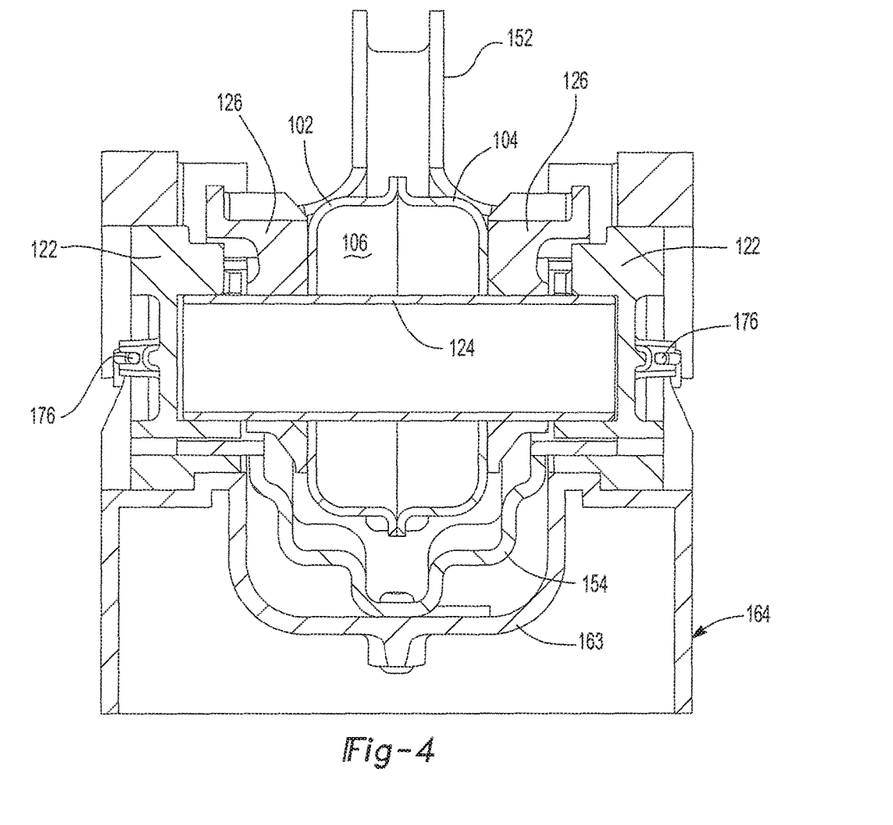
FIG. 4 illustrates a cross sectional view of the pedal arm along line 4-4 of FIG. 3.

The center portion of each of the pedal arm shell pieces 102 and 14 has an opening 134 in the forward direction and a pair of slots in each side portion. A generally rectangular bracket 130 for holding a cage 132 for mounting a ball 141 and as shown in FIG. 2 for attachment at the end of the brake booster pushrod is mounted within the cavity. The bracket 130 has a pairs of tabs 136 extending from either side and a central area for receiving the cage and ball. The tabs 136 are spaced and extend through slots 128 formed in the sides of the shell pieces 102 and 104 and then the two sides are mated and welded. Additionally the tabs 136 are welded to the sides to provide a strong, secure and redundant attachment of the cage to the pedal arm. The opening in the forward side is formed in the front side of the pedal arm for receiving the brake booster rod 140 and its ball end 141 and permits attachment. A lower end 142 of the pedal arm is formed for mounting a conventional conventional pedal pad 144.

A variation of the pedal assembly may be provided where the pedal arm is the same except the sleeve to receive the pivot rod is eliminated. Various configurations of the specific geometry of the shell configuration should be appreciated to save in both weight and space. The embodiment as shown in FIGS. 1-4 demonstrate an approximate 33% weight savings. Other proposals can save as much as 50%+ weight savings as well as reducing the amount of deflection occurring in the pedal arms.

Figure 1:
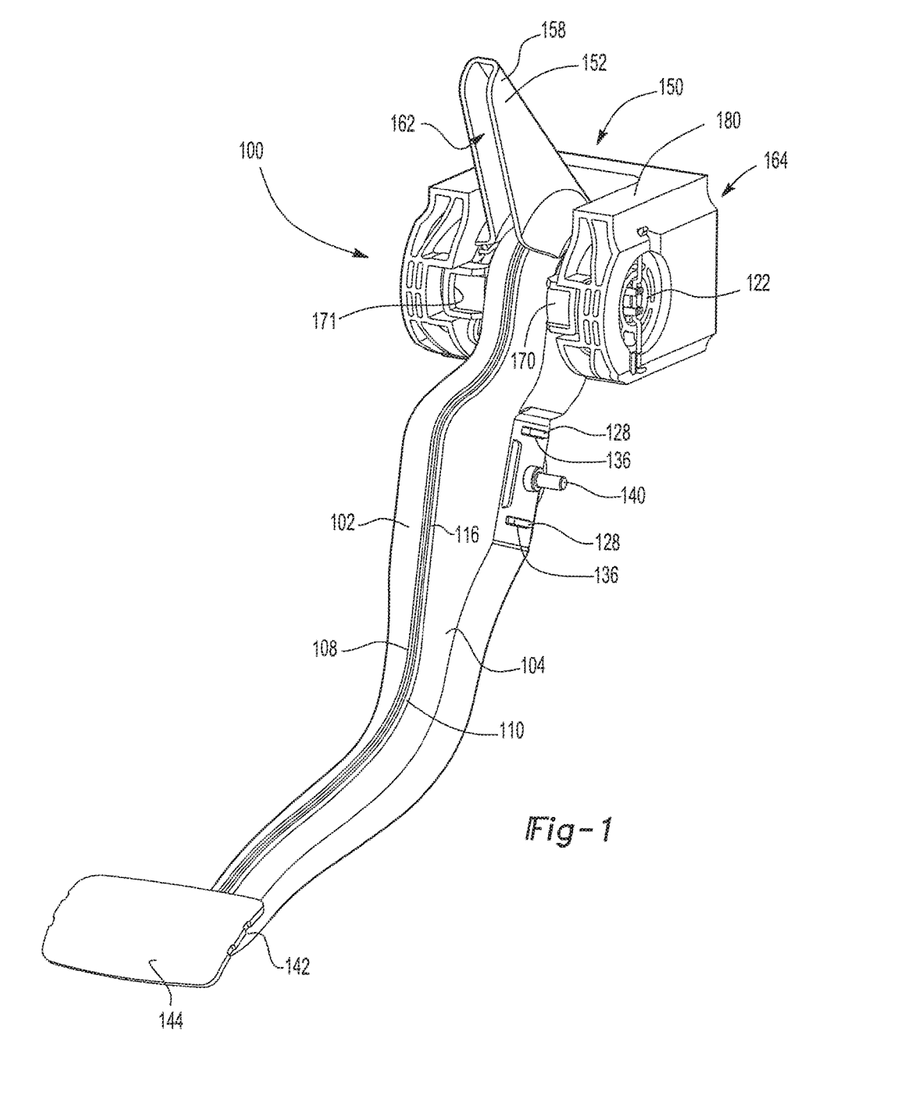
FIG. 1 illustrates a perspective a one embodiment of the two piece pedal arm.

As shown in FIGS. 1-4, the shell pedal arm assembly may be used with a pedal release system 150. As shown in FIGS. 1 and 2, the assembly also includes a mounting bracket 164, a striker 152, a pair of bushings 122, and tongues 154, 156 which extend between the striker and the bushings 122. The striker 152 is formed of a stamped seal and has a triangular-shaped portion 158 which extends upwardly from a lower portion 160 with a cavity 162. A bearing surface 163 is formed on the center of the exterior of the lower portion 160 of the striker. The bearing portion rides on the housing as the striker rotates during a collision. The striker remains stationary during normal pedal operation and only rotates during a collision.

Figure 5:
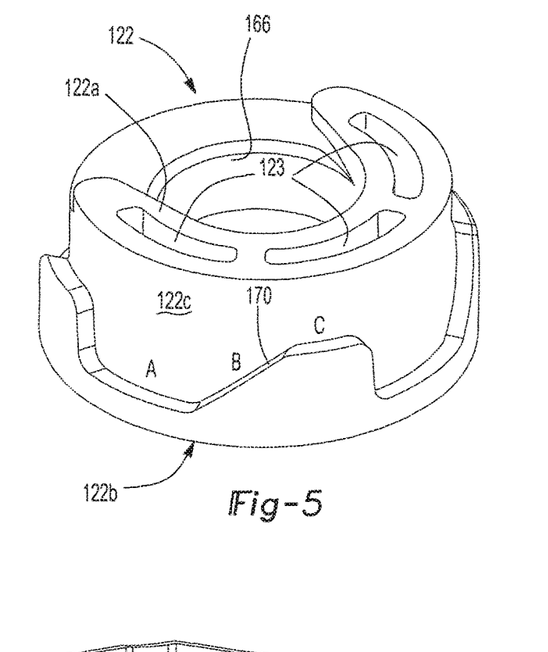
FIG. 5 illustrates a perspective view of the bushing of the present invention having the ramped portion.

Each bushing 122 has an interior side 122a and exterior side 122b, and a circumferential surface 122c. The interior side 122a has three cavities 123 formed to receive the tongues 154, 156. The interior has a C-shaped surface with the opening in the "C" directed forwardly. The circumference has three notches which form a ramp-like guide surface which rides on a corresponding ramp surface formed in the housing 164. The bushings have a central bore 166 for supporting the pivot rod 124 and pedal arm.

Figure 6:
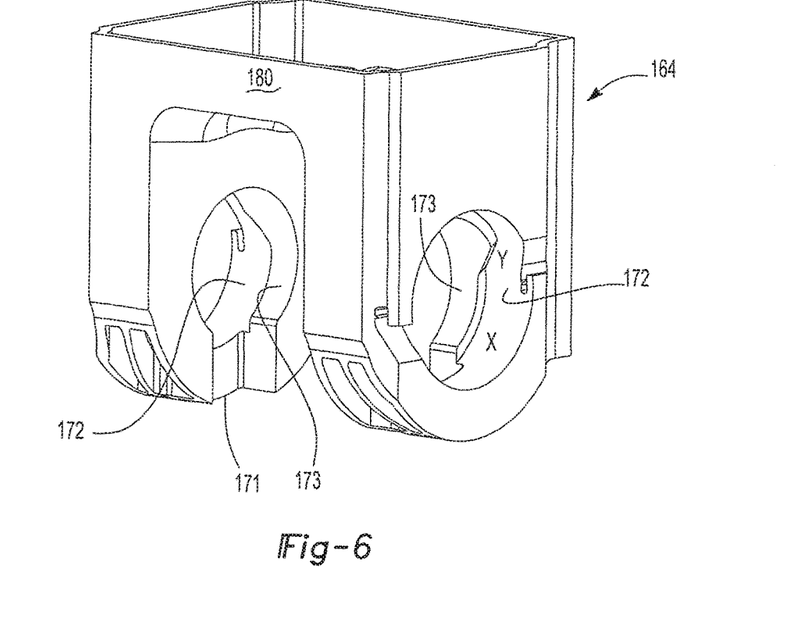
FIG. 6 illustrates a perspective view of the bracket of the present invention having a ramped portion corresponding to the ramped portion of the bushing.

The housing 164 is generally U-shaped (in outline at 180) and having circular apertures for receiving the bushings extending through each arm. On the interior surface of each aperture is formed a series of projections having a ramped or angled edge, see pairs of ramps at 172 and 173 defining each spaced apart aperture, corresponding to the ramped guide surfaces formed on the circumference of the bushings. When assembled, the striker is in a rearward (more angled) position. During a front-end crash the striker will contact the vehicle crossbeam (not shown) and be moved forwardly and upwardly. This forward movement pivots the striker upwardly within the housing and rotates the bushings 122 by way of the tongues 154, 165. The rotation of the bushings 122 results in the ramp surfaces 170 of the bushings moving along the ramps 172 and 173 of the housing bracket apertures to move the bushings axially outwardly of the housing. The bushings 122 are moved outwardly sufficiently so that the ends of the pivot rod 124 exits the bores 166, releasing the pivot rod 124 and pedal arm to move rearwardly through an opening in the C-shaped surface of the housing which is defined by a pair of recessed notches 171 in the inner-most opposing pair of spaced apart ramps 173 as clearly shown in FIG. 6. The bushing 122 includes a plurality of surfaces A, B and C of the ramp 170. At rest, the point C is in contact with point X of the ramp 172 of the housing. Once the striker 152 is rotated to rotate the bushings 122 against the housing to a point where point C is in contact with point Y (FIG. 6), the bushing will have moved away from the housing enough to allow the pivot rod 124 to escape the housing. Safety pins 176 or tabs extend between the housing 164 and striker 152 to keep the bushings in place during normal use.

Figure 7:
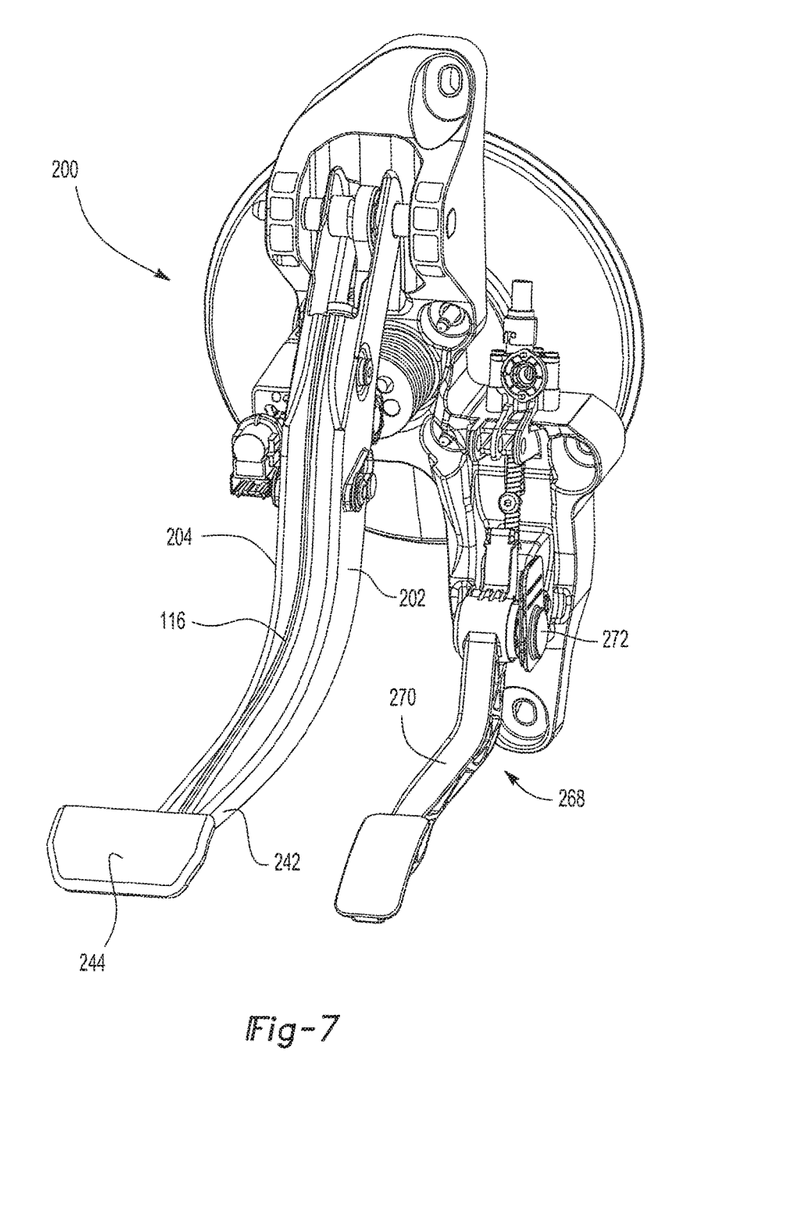
FIG. 7 illustrates an perspective view of an alternative embodiment of an adjustable two piece pedal assembly.
Figure 8:
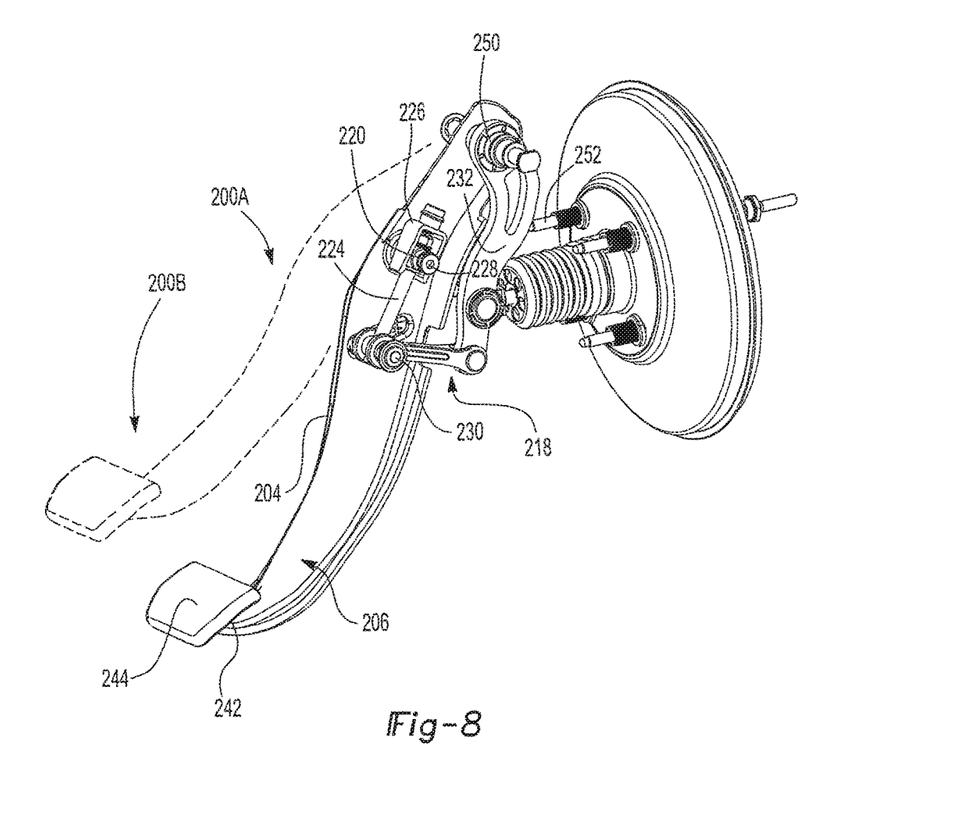
FIG. 8 illustrates a perspective partial cutaway view of the pedal assembly of FIG. 7.

A second embodiment shell pedal arm assembly 200 included in an adjustable pedal package 202 with an adjustable brake pedal arm and an adjustable electric throttle control (ETC) is shown in FIGS. 7 and 8. The shell pedal assembly 200 includes two shell pieces being a left hand side shell piece 202 and a right hand side shell piece 204 which are welded together to form a cavity 206 therebetween. Directions such as forward, rearward, left hand, and right hand will be used in reference to the manner in which a pedal arm will be positioned in a vehicle. Each of the side shell pieces has a central portion extending between an upper end and a lower end. Each of the two shell pieces 202, 204 has a generally C-shaped cross section with a side portions 212, 214 extending between a front portion and a rear portion. The edges of the front portions and the edges of the rear portions are welded together (as illustrated at reference number 216).

The shell brake pedal arm assembly 200 has a mechanism 218 for adjusting the pedal height. As shown in FIGS. 7 and 8, the adjustable brake arm assembly includes a shell having a cavity 206 with an adjustment mechanism 218. As shown in FIG. 8, an adjustment mechanism has a drive assembly 220 with a screw rod 224. The drive assembly 220 has a frame 226 holding a crosspiece 228 having a bore and cylindrical ends which are received in apertures formed in the right and left sides of the pedal arm. The screw rod 224 is pivotally supported in the frame and extends downwardly to extend through the bore in the crosspiece 228 to a cross member 230 with a threaded bore. The cross member has a pair of cylindrical end portions which extend into the slots of the right and left sides 202, 204.

A lever arm 232 extends downwardly from the pivot rod 250 supporting the pedal arm 200. A brake booster pushrod 252 is pivotally attached to the lever arm. At the bottom end is a connecting arm having yokes at either end. One set of yokes is pinned to the lever arm and the other end is connected to the cylindrical portions of the cross member. The connecting arm extends through an aperture formed in the front side of the pedal arm. A drive cable extends from a motor to turn the screw rod. When the screw rod is rotated in one direction, the cross member is drawn upwardly resulting in movement of the cylindrical portions from a rear end of the slot in the initial position to the forward end of the slot in the adjusted position. The pedal arm is thereby moved rearwardly and upwardly as a result of the adjustment.

The adjustable electronic throttle control (ETC) assembly 268 includes a pedal arm 270 and position sensor 272 which form a unit mounted to a swing plate. The swing plate is pivotally mounted to a mounting bracket for the pedal assembly. A drive motor having a screw rod is mounted to the bracket to extend downwardly alongside of the swing plate. The screw rod is received in a threaded member which moves upwardly and downwardly upon rotation. A C-shaped member is attached at an upper portion to the threaded member. A connecting member is connected to the bottom of the C-shaped member and to a pivoting link. The connecting member has pin portions received in slots in the swing plate. The link is pivotally mounted at one end to the bottom of the mounting bracket and mounted at the upper end to the connecting member to constrain the travel to move the crosspiece within the slots and move the swing plate inwardly and outwardly in response to rotation of the screw rod. The electric motor which turns the screw rod has a connector to connect to the drive cable which rotates the screw rod of the brake assembly. Thus, both the position of the brake pedal, pad, and the ETC pedal pad can be adjusted at the same time.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

We claim:

1. A pedal assembly for attachment to a brake booster pushrod having a ball end, said assembly comprising:
a pedal arm having a first shell piece and a second shell piece, the first shell piece and the second shell piece each having a mating edge;
a "U" shaped housing with a pivot rod extending within the housing, a "U" shaped housing with a pivot rod extending within the housing, the pedal arm being received in housing at an upper end and pivoting about the pivot rod, a striker supported by the housing and in abut the pivot rod;
the first shell piece and the second shell piece are connected together at the mating edges to form an inner cavity therebetweeen; and
the ball end of the brake booster pushrod adapted to being mounted to a cage positioned within the inner cavity of said pedal arm.

2. The pedal assembly of claim 1 further comprising a pair of bushings supported in the housing and rotatable with the striker, the bushings each having a ramped portions in communication with additional ramps configured in the housing, allowing for displacement of the bushings away from the housing and the pivot rod upon rotation of the striker.

3. The pedal assembly of claim 1 further comprising an adjustment assembly connected to the pedal arm.

4. The pedal assembly of claim 3 the adjustment assembly further comprising a screw rod to adjust the height of the pedal arm.

5. The pedal assembly of claim 1, further comprising a bracket positioned between said shell pieces, said bracket and cage adapted to securing therebetween the ball end of the brake booster pushrod.

6. The pedal assembly of claim 5, further comprising slots configured within the first and second shell pieces, the bracket including tabs inserted into the slots prior to connecting together the shell pieces.

7. The pedal assembly of claim 1, further comprising an opening in a selected one of the first and second shell pieces and which is adapted for receiving the brake booster pushrod.

8. A pedal release assembly, comprising:
a housing having a pair of spaced apart sides, each side incorporating an aperture defined by at least one circumferentially extending ramp surface;
a pedal arm pivotally secured at an upper end about a pivot rod in turn supported between the apertures of the housing;
a pair of bushings seated within and supported by the apertures around the pivot rod, each of the bushings having circumferentially extending ramped portions seating against the housing aperture defined ramp surfaces; and
a striker pivotally supported about the pivot rod and slaved to the bushings;
upon an impact occurrence, inertial induced rotation of the striker resulting in the ramped portions of the bushings coacting against the ramped surfaces of the housing, the bushings displacing to unseat from the pivot rod, permitting the pivot rod and pedal arm to be disengaged from the housing.

9. The pedal release assembly as described in claim 8, further comprising a pair of recessed notches defined in opposing inner facing surfaces of the housing sides, outward displacement of the bushings providing release passage for the pivot rod from the housing.

10. The pedal release assembly as described in claim 8, said pedal arm further comprising a first shell piece and a second shell piece which are joined together to define a cavity therebetween.

11. The pedal release assembly as described in claim 10, further comprising a cage for securing a bracket, both of which are mounted within the cavity, the bracket in turn adapted to mount a ball end of a brake booster pushrod extending from the pedal arm.

12. The pedal release assembly as described in claim 11, further comprising slots configured within the first and second shell pieces, the bracket including tabs inserted into the slots prior to connecting together the shell pieces.

13. The pedal release assembly of claim 11, further comprising an opening in a selected one of the first and second shell pieces and which is adapted for receiving the brake booster pushrod.

14. A pedal assembly comprising:
a housing having an aperture;
a pedal arm having a first shell piece and a second shell piece, the first shell piece and the second shell piece each having a mating edge;
the first shell piece and the second shell piece are connected together at the mating edges to form an inner cavity therebetweeen;
the pedal arm pivotally secured at an upper end about a pivot rod in turn supported within the aperture of the housing;
a striker pivotally supported about the pivot rod; and
a bushing connected to the pivot rod and the striker, the bushing having a ramped portion in communication with the housing, the ramped portion of the bushing allowing for movement of the bushing away from the housing and away from the pivot rod upon rotation of the striker and the bushing.

15. A pedal assembly for attachment to a brake booster pushrod having a ball end, said assembly comprising:
a pedal arm having a first shell piece and a second shell piece, st shell piece and the second shell piece each having a mating edge;

the first shell piece and the second shell piece are connected together at the ating edges to form an inner cavity therebetweeen;

the ball end of the brake booster pushrod adapted to being mounted to a cage positioned within the inner cavity of said pedal arm; and a bracket positioned between said shell pieces, said bracket and cage adapted to securing therebetween the ball end of the brake booster pushrod, slots configured within the first and second shell pieces, the bracket including tabs inserted into the slots prior to connecting together the shell pieces.

\* \* \* \* \*